(No Model.)
H. W. YORKE.
EDUCATIONAL APPLIANCE.
No. 544,714. Patented Aug. 20, 1895.
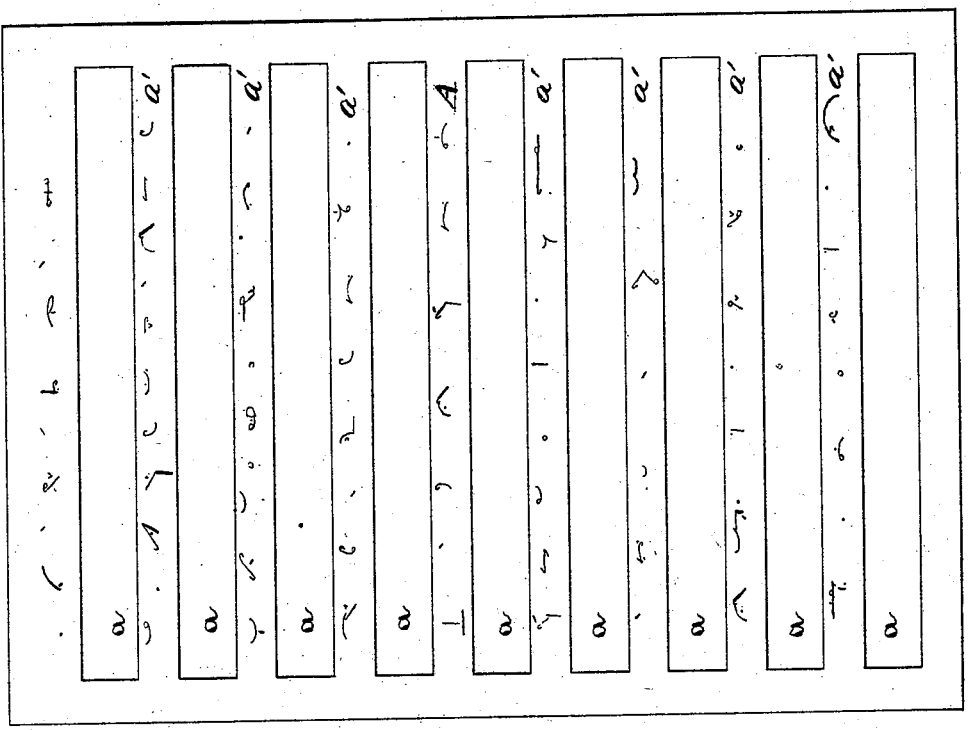
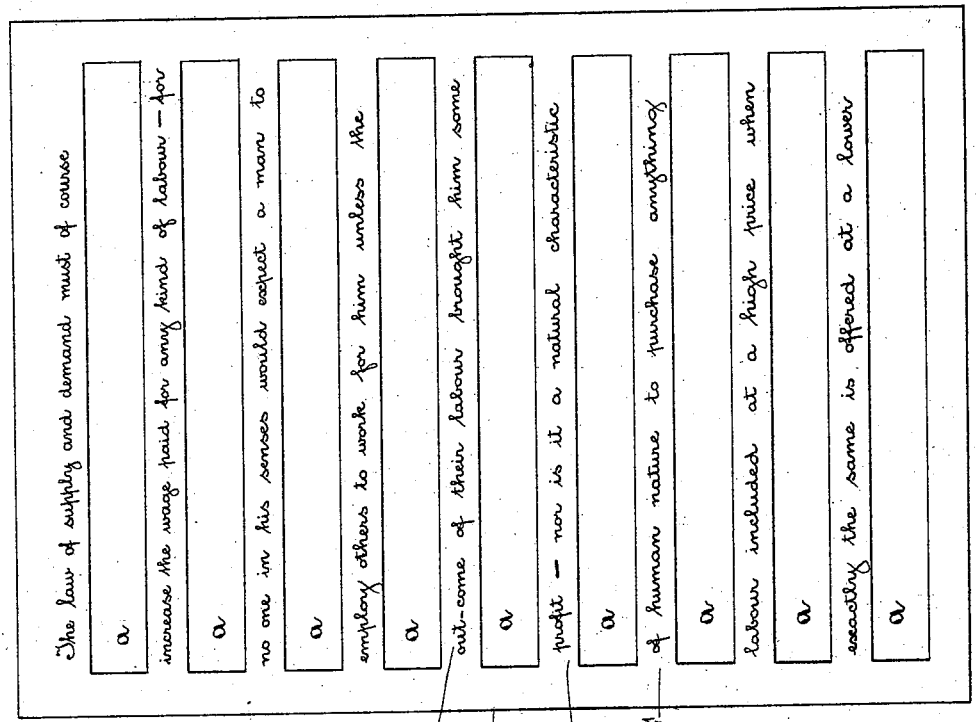
WITNESSES.
William H. James.
Alfred H. Broad.
INVENTOR.
Harry Walter Yorke.
per Robert C. Phillips.
Attorney.

United States Patent Office.

HARRY WALTER YORKE, OF GROS PUITS, ISLE OF JERSEY, ENGLAND.

EDUCATIONAL APPLIANCE.

SPECIFICATION forming part of Letters Patent No. 544,714, dated August 20, 1895.

Application filed May 27, 1895. Serial No. 550,902. (No model.)

*To all whom it may concern:*

Be it known that I, HARRY WALTER YORKE, a subject of the Queen of Great Britain, residing at Gros Puits, Jersey, one of the Channel Islands, England, have invented a new and useful Improvement in Educational Appliances, of which the following is a specification.

This invention relates to an appliance for facilitating the teaching or learning and the correction of shorthand, the translation of languages, and the like; and it consists, essentially, of a sheet of paper or other suitable material having a series of transverse slots or openings, the bars between the said slots or openings having on the one side the writing to be transcribed or the matter to be translated, and on the other side the correct transcription or translation of the said matter, the object being to enable the said transcription or translation to be readily checked or corrected.

In the accompanying drawings, which form part of this specification, an appliance is shown, by way of example, adapted for teaching shorthand, Figure 1 being a view of the front of the appliance, and Fig. 2 a view of the back thereof.

Similar letters refer to similar parts throughout the two views.

The appliance consists of a sheet A, of paper, board, or other suitable material, having a series of transverse slots or openings $a\ a$. On the bars $a'$, between the said slots or openings, is written or printed the matter to be transcribed, while on the back of the said bars $a'$ is written or printed the true transcription of the matter on the fronts of the bars.

In use the appliance is placed over a sheet of paper or its equivalent and the transcription of the writing on the bars is written by the pupil on the paper left uncovered by the slots or openings in the appliance. To ascertain the correctness of such transcription, the apparatus is simply reversed, and the transcription rendered by the pupil compared with the true transcription on the backs of the bars $a'$.

By the use of this apparatus the task of correcting and the time occupied thereby are materially lessened.

I prefer that the front side of the sheet be made of a different color from the back thereof, so that it can be seen at a glance which side is being used; but this is not obligatory.

This appliance, though specially adapted for teaching shorthand, is also adapted for teaching foreign languages and knowledge of all kinds through the medium of questions and answers.

What I claim, and desire to secure by Letters Patent, is—

An appliance for facilitating the teaching or learning and the correction of shorthand, foreign languages and the like, consisting of a sheet of paper or other suitable material having a series of transverse slots or openings, on the bars or strips between which—on one side of the sheet—is the matter to be transcribed, translated or construed and on the backs of the said bars or strips on the other side of the sheet the correct transcription, translation or construction, as set forth.

HARRY WALTER YORKE.

Witnesses:
 E. B. RENOUF,
 J. BROECK LE MAISTRE.